United States Patent [19]
Ejiri et al.

[11] Patent Number: 4,965,676
[45] Date of Patent: Oct. 23, 1990

[54] FACSIMILE REMOTE DIAGNOSTIC SYSTEM

[75] Inventors: Koichi Ejiri, Santa Clara; Tina Jeng, San Jose; Rithy Roth, Richmond; Lak M. Lam, San Jose, all of Calif.

[73] Assignee: Ricoh Corporation and Ricoh Company, Ltd., San Jose, Calif.

[21] Appl. No.: 317,190

[22] Filed: Feb. 28, 1989

[51] Int. Cl.$^5$ .............................................. H04H 1/00
[52] U.S. Cl. ..................................... 358/406; 358/404
[58] Field of Search ................................ 358/406, 404

[56] References Cited

U.S. PATENT DOCUMENTS 3,830,962  8/1974  Mailloux .............................. 358/406
4,727,429  2/1988  Ueno .................................... 358/406

FOREIGN PATENT DOCUMENTS 0125950  7/1983  Japan .................................... 358/406
0022475  2/1984  Japan .................................... 358/406

Primary Examiner—Edward L. Coles, Sr.
Attorney, Agent, or Firm—Flehr, Hohbach, Test, Albritton & Herbert

[57] ABSTRACT

A remote diagnostic system provides remote diagnostics for one or more facsimile apparatus. The system comprises facsimile, a communication control adapter and a personal computer (with expert knowledge). The system includes several kinds of data files which work under a window environment, together with communication software, to look up and rewrite the buffer memory in each facsimile.

6 Claims, 23 Drawing Sheets

FIG.−3

BIT SWITCH TABLE

| BS | BIT | FUNCTION |
|----|-----|----------|
| 0 | 0 | BACK TO BACK FUNCTION 1 : ENABLED WHEN THIS BIT IS SET TO '1', THE START KEY IS ENABLED WITHOUT HANGING UP THE HANDSET |
| | 1 | MEMORY READ / WRITE ACCEPTABLE 0 : NOT ACCEPTABLE WHEN THIS BIT IS SET TO '0', A MEMORY READ / WRITE REQUEST IS NOT ACCEPTED. |
| | 2 | NOT USED |
| | 7 | COMMUNICATION PARAMETER DISPLAY 1 : DISPLAY ENABLED WHEN CONNECTED IN GIII MODE, THE COMMUNICATION PARAMETERS ARE DISPLAYED AS SHOWN BELOW. |

CUSTOMER : RICOH SAN JOSE
FAX NO. : 4520637
FAX MODEL : K55
TEL NO. : 432 8800

BIT SWITCH SETTING

| BS | VALUE |
|----|-------|
| 0 | 00000000 |
| 1 | 01000100 |
| 2 | 00000000 |
| 3 | 00000000 |
| 4 | 10000100 |
| 5 | 00000000 |

[WRITE] [CANCEL]

FIG.-5

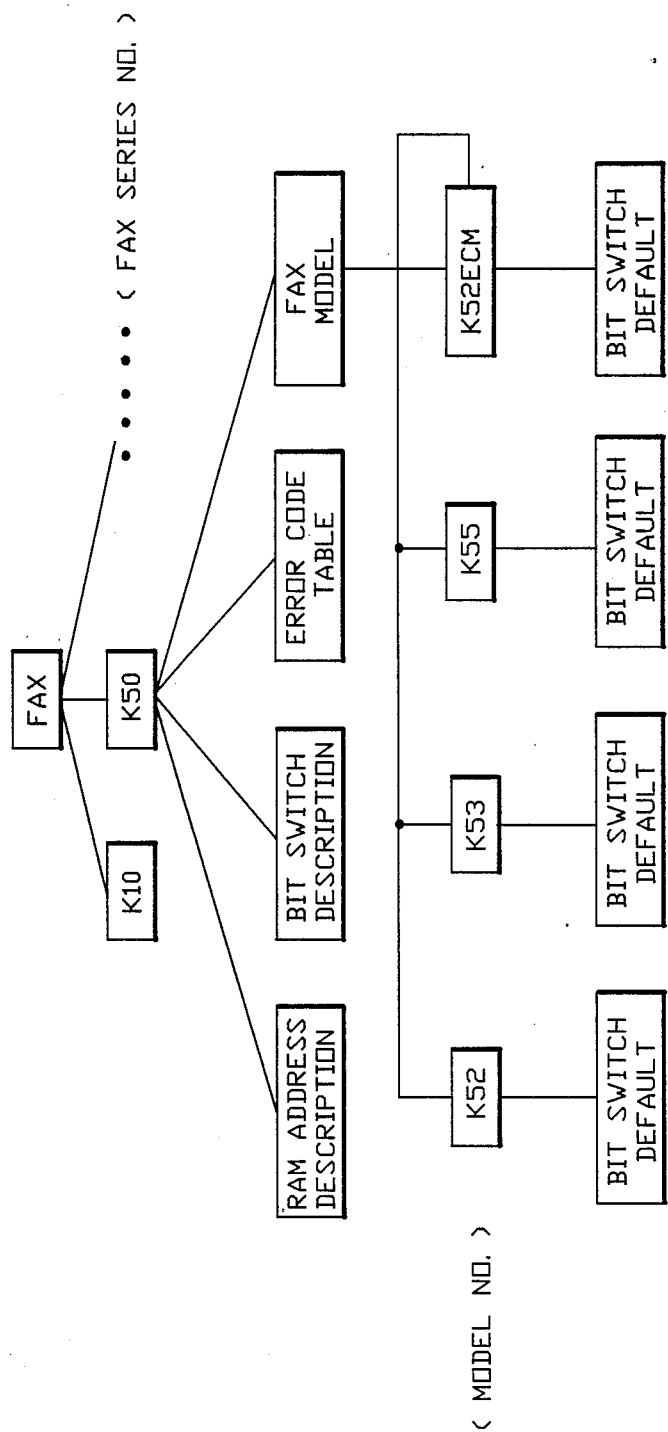
FIG.—7

```
FAX REGISTRATION

INSERT  UPDATE  DELETE

PLEASE REGISTER FAX SERIES :
   SERIES NO.      BS START ADR.       BS END ADR.

1.  K10
2.  K50             0080                009F
3.  K12/13          C7CB                C7D6
4.

OK                              CANCEL
```

=> DATA FILE :

FAX . DAT :

| K10 | START | END | K50 | START | END | ..... |

THE FAX SERIES REGISTERED ABOVE WILL AUTOMATICALLY
CREATE 1 DATA FILE — FIRST 5 CHARACTERS OF FAX
SERIES + ' . ' + ' DAT ' ; THEREFORE , HERE , WE HAVE
K10 . DAT , K12/1 . DAT AND K50 . DAT .
THEN , EACH FILE WILL ALSO CREATE 4 SUB FILES .
FOR EXAMPLE , K50 . DAT WILL GENERATE K50RAM . DAT ,
   K50BS . DAT , K50ERR . DAT AND K50MOD . DAT
      THESE FILES WILL BE DEFINED LATER .

K50 . DAT :

| K50RAM . DAT | K50BS . DAT | K50ERR . DAT | K50MOD . DAT |

FIG.—8

```
┌─────────────────────────────────────┐
│ —           FAX MODEL TABLE    ↑↓   │
├─────────────────────────────────────┤
│ INSERT   DELETE                     │
│                                     │
│   ENTER FAX SERIES NO. :  [ K50 ]   │
│                                     │
│   ALL REGISTERED MODEL NO. :        │
│   K52 K53 K55 K52ECM K53ECM K55ECM  │
│                                  ←| │
│                                     │
│   ENTER FAX MODEL NO. : [ K57ECM ]  │
│                                     │
│       [ OK ]      [ CANCEL ]        │
│                                   → │
└─────────────────────────────────────┘
```

NOTE : FUNCTION —
  INSERT : REGISTER A NEW FAX MODEL.
  DELETE : DELETE A SPECIFIED FAX MODEL.

=> DATA FILE : THIS PARTICULAR FAX SERIES MUST HAVE BEEN REGISTERED
  DURING FAX REGISTRATION STEP. A FAX MODEL FILE NAME
  IS DEFINED AS THE FIRST 5 CHARACTERS OF FAX SERIES +
  'MOD' + '.DAT', ALSO THOSE FAX MODELS WHICH REGISTER
  ABOVE WILL AUTOMATICALLY CREATE 1 DATA FILE — THE
  FIRST 5 CHARACTERS OF FAX MODEL + 'DEF' + '.' + '.DAT',
  THEREFORE, HERE, WE HAVE K52DEF.DAT, K53DEF.DAT AND
  K55DEF.DAT. THESE FILES WILL BE DEFINED LATER.
  FOR EXAMPLE : FAX K50 SERIES WILL GENERATE A DATA
            FILE CALLED K50MOD.DAT.

| K50MOD.DAT : | K52 | K53 | K55 | K52ECM | . . . . . |

```
┌─────────────────────────────────────────────────────────────┐
│                    RAM DATA DEFINITION              ↑│↓│←│  │
├─────────────────────────────────────────────────────────────┤
│ INSERT  SEARCH  DELETE                                      │
│ ADR   PRIOR  TYPE     DESCRIPTION              REMARK    ←│ │
│ 0402    5      0    TELINF CONTROL HEADER.               │ │
│ 0602    5      0    RAM FOR TELEPHONE NUMBER             │ │
│                     REGISTER.                            │ │
│ 1002    4      0    TELOS INPUT PARAMETER                │ │
│                     STORING RAM.                         │ │
│ 1102    4      0    TELOS OUTPUT DATA STORING            │ │
│                     RAM                                  │ │
│ 1202    5      0    ONE TOUCH DIAL PROPER NOUN           │ │
│                     REGISTERING AREA.                    │ │
│ 140F    5      0    GROUP PROPER NOUN REGISTERING        │ │
│                     AREA.                                │ │
│ 14A2    6      0    TOP ADDRESS OF EMPTY AREA OF         │ │
│                     TELINF ( LOW ).                      │ │
│ 14A3    6      0    TOP ADDRESS OF EMPTY AREA OF         │ │
│                     TELINF ( HIGH ).                   → │ │
│                                                             │
│              ┌────────┐                ┌────────┐           │
│              │ UPDATE │                │ CANCEL │           │
│              └────────┘                └────────┘           │
└─────────────────────────────────────────────────────────────┘
```

NOTE :
PRIORITY WILL BE RATED BETWEEN
10 TO 1 ( HIGH TO LOW ).

TYPE - 0 ; HEX DATA TYPE.
       1 ; DECIMAL DATA TYPE.
       2 ; ASCII DATA TYPE. ( UPPER CASE )

FUNCTION -
INSERT ; INSERT A NEW RECORD TO THE DATA FILE.
SEARCH ; SEARCH A PARTICULAR RECORD BASED ON ADDRESS.
DELETE ; DELETE A SPECIFIED RECORD.

=> DATA FILE ; NAME IS DEFINED AS THE FIRST 5 CHARACTERS OF FAX
               SERIES + " RAM " + " DAT "
               FOR EXAMPLE ; K50RAM . DAT WHICH MUST HAVE BEEN
               CREATED DURING FAX REGISTRATION STEP.

K50RAM . DAT ;

| ADRS | PRIOR | TYPE | DESCRIPTION | REMARK |
|------|-------|------|-------------|--------|
| ( 4 )| ( 1 ) | ( 1 )| ( 120 )     | ( 100 )|

FIG.-11

```
          K50 BIT SWITCH INFORMATION
START ADDRESS : [0080]        END ADDRESS : [009F]
                 [OK]            [CANCEL]
```

| BIT SWITCH DEFINITION |
|---|

INSERT   SEARCH   DELETE

```
BS BIT  DESCRIPTION                   REMARK
0  0  BACK TO BACK FUNCTION    1:ENABLED    TO DIRECTLY CONNECT TWO
      WHEN THIS BIT IS SET TO "1", THE      MACHINES AND CHECK THE
      START KEY IS ENABLED WITHOUT          COMMUNICATION.
      HANGING UP THE HANDSET.
   1  MEMORY READ/WRITE ACCEPTABLE          THIS BIT SHOULD BE "1"
      0:NOT ACCEPTABLE                      WHEN RAM DATA IS TO BE
      WHEN THIS BIT IS SET TO "0"           CHANGED FROM THE SERVICE
      A MEMORY READ/WRITE REQUEST           CENTER BY A K10 MACHINE.
      IS NOT ACCEPTED.
   2  NOT USED
   7  COMMUNICATION PARAMETER DISPLAY       TO CONFIRM THE COMMUNI-
      1:DISPLAY ENABLED                     CATION PARAMETERS.
1  0  FAX/TEL SELECTION
      0:FAX       1:TEL
      THIS BIT CAN BE CHANGED BY
      FUNCTION 51(K53/55/57) OR TEL
      MODE KEY (K52)
              [UPDATE]      [CANCEL]
```

NOTE : FUNCTION - INSERT : INSERT A NEW RECORD IN THE MIDDLE.
                  SEARCH : SEARCH A RECORD BASED ON BIT SWITCH NUMBER.
                  DELETE : DELETE A SPECIFIED RECORD.

i) DATA FILE NAME : K50BS.DAT IS DEFINED AS THE FIRST 5 CHARACTER OF FAX SERIES + "BS" + "." + "DAT",
   FOR EXAMPLE : K50BS.DAT WHICH MUST HAVE BEEN CREATED DURING FAX REGISTRATION STEP.

K50BS.DAT : | BS | BIT | DESCRIPTION | REMARK |
            | (2) | (1) | (120) | (100) |

```
          K52 DEFAULT TABLE

BS              VALUE
    0         0 0 0 0 0 0 0 0
    1         0 1 0 0 0 0 0 0
    2         0 0 0 0 0 0 0 0
    3         0 0 0 0 0 0 0 0
    4         1 0 1 0 0 1 0 0
    5         0 0 0 0 0 0 0 0
    6         0 0 0 0 0 0 0 0
    7         0 0 0 0 0 0 0 0
    8         0 0 0 0 0 0 0 0
    9         0 0 0 0 0 0 0 0
    A         1 0 0 0 0 0 0 0
    B         0 1 1 0 0 0 0 0

[UPDATE]        [CANCEL]
``` ii ) DATA FILE :
NAME IS DEFINED AS FAX MODEL + "DEF" + "." + "DAT"
FOR EXAMPLE :
K52DEF.DAT WHICH MUST HAVE BEEN
CREATED DURING FAX MODEL TABLE STEP.

K52DEF.DAT : | BIT SWITCH | VALUE |

| | K50 ERROR CODE TABLE | |
|---|---|---|
| INSERT UPDATE DELETE | | |
| PREFIX | CODE | DESCRIPTION |
| 0 | 00 | INITIAL ID SIGNAL UNDETECTED |
| 0 | 01 | RECEIVED "DCN FRAME" FROM REMOTE FAX |
| 0 | 03 | MODEM INCOINCIDENCE |
| 0 | 04 | FAIL TO RECEIVE THE TRAINING RESPONSE "CFR/FTT" |
| 0 | 05 | TRAINING FAILURE AFTER SHIFTDOWN TO 2400 BPS. |
| 0 | 06 | REMOTE-FAX-FAIL TO RECEIVE THE "DCN" FRAME |
| 0 | 07 | FAIL TO RECEIVE THE RESPONSE,"MCF/RTP/RTN/PIP/PIN" AFTER MESSAGE EXCHANGE. |
| 0 | 08 | RECEIVED COPY NG(RTN/PIN) |
| 0 | 14 | RECEIVED UNKNOWN CODE AFTER MESSAGE EXCHANGE. |
| 0 | 15 | THE REMOTE FAX HAS NO FUNCTION OF "CONFIDENTIAL" OR "RELAY-TRANSMISSION" |
| 0 | 16 | FAIL TO RECEIVE THE RESPONSE (CFR/FTT) FOR "CONFIDENTIAL" OR "RELAY-TRANSMISSION" |
| 0 | 52 | SIGNAL TURNED OVER |
| 4 | 01 | LINE CUT (ELECTRIC CURRENT CUT) DETECTED. |

UPDATE    CANCEL

NOTE : FUNCTION – INSERT ; INSERT A NEW RECORD IN THE MIDDLE,
       SEARCH ; SEARCH A RECORD BASED ON THE PREFIX,
       DELETE ; DELETE A SPECIFIED RECORD,

=> DATA FILE : NAME IS DEFINED AS THE FIRST 5 CHARACTERS OF FAX
   SERIES + "ERR" + "." + "DAT"
   FOR EXAMPLE : K50ERR.DAT WHICH MUST HAVE BEEN CREATED
   DURING FAX REGISTRATION STEP.

R50ERR.DAT : | PREFIX | CODE | DESCRIPTION |

```
┌─────────────────────────────────────────────────────┐
│  ─  │    CUSTOMER INFORMATION        │ ↑ │ ↓ │
│ ┌─────────────────────────────────────────────┬───┐ │
│ │ CUSTOMER NAME    :                          │ ↑ │ │
│ │ FAX TEL NO.      : 1.                       │   │ │
│ │                  : 2.                       │   │ │
│ │ DEPARTMENT CODE  :                          │   │ │
│ │ FAX MODEL        :                          │   │ │
│ │ TEL NUMBER       :                          │   │ │
│ │ FAX SERIAL NO.   :                          │   │ │
│ │   - ERROR REPORT HISTORY ( UPTO 100 )       │   │ │
│ │   -                                         │   │ │
│ │   - BIT SWITCH STATUS CHANGE HISTORY ( UPTO 100 ) │
│ │   -                                         │   │ │
│ │   - CDD THRESHOLD HISTORY ( UPTO 30 )       │   │ │
│ │   -                                         │   │ │
│ │   - PULSE WIDTH HISTORY  ( UPTO 30 )        │   │ │
│ │   -                                         │   │ │
│ │   - ANALYSIS RESULT HISTORY ( UPTO 30 )     │   │ │
│ │   -                                         │   │ │
│ │   - DIAGNOSIS HISTORY    ( UPTO 30 )        │   │ │
│ │   -                                         │   │ │
│ │                                             │   │ │
│ │  [ OK ]              [CANCEL]               │   │ │
│ └─────────────────────────────────────────────┴─↓─┘ │
```

NOTE : FUNCTION -
         INSERT : ADD A NEW CUSTOMER RECORD.
         UPDATE : UPDATE A SPECIFIED CUSTOMER RECORD.
         DELETE : DELETE A SPECIFICM CUSTOMER RECORD.
   KEY : CUSTOMER NAME
         OR
         FAX TEL NO.

FIG.−14

| ← | ← | | → |
|---|---|---|---|

SERVICE CENTER INFORMATION

| INSERT | UPDATE | DELETE |
|---|---|---|

TELEPHONE NO. :
FAX TEL NO. :
ADDRESS :
CITY :                    ZIP :
STATE :
CONTACT PERSON :

[ OK ]                              [ CANCEL ]

NOTE : FUNCTION —
     INSERT : ADD A NEW SERVICE CENTER RECORD.
     UPDATE : UPDATE A SPECIFIC RECORD BASED ON
              ZIP CODE , STATE OR CITY.
     DELETE : DELETE A SPECIFIC RECORD BASED ON
              ZIP CODE , STATE OR CITY.

FIG.—15

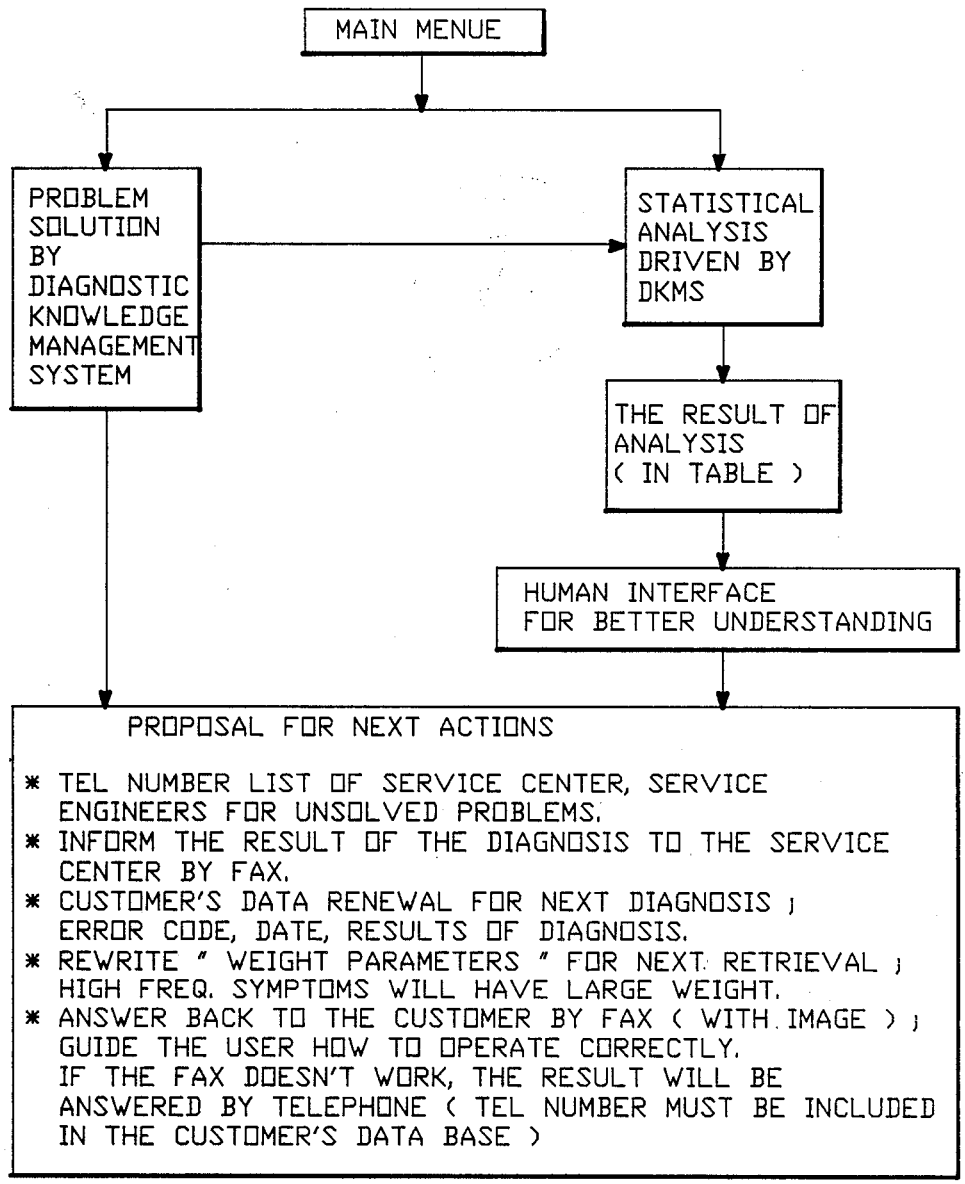
FIG.−16

| ADDRESS ID | SUCCESS TIMES (*) | WEIGHT | NEXT NODE ID | SUCCESS TIMES (*) | CONDITIONAL BIT PATTERN |
|---|---|---|---|---|---|
| P0001 | 0 | 10 | S0010 | 0 | BIT ( 1101000.. ) |
|  |  | 9 | S0011 | 0 | BIT ( 1110111.. ) |
| P0002 | 0 | 10 | S0020 | 0 | BIT ( 1101000.. ) |
| .. |  | .. | .. |  | .. |
| .. |  | .. | .. |  | .. |

SymToCau

| ADDRESS ID | SUCCESS TIMES (*) | WEIGHT | NEXT NODE ID | SUCCESS TIMES (*) | CONDITIONAL BIT PATTERN |
|---|---|---|---|---|---|
| S0001 | 0 | 9 | C0101 | 0 | BIT ( 1101000.. ) |
|  |  | 10 | C0102 | 0 | BIT ( 1110111.. ) |
| S0011 | 0 | 10 | C0103 | 0 | BIT ( 1101000.. ) |
| .. |  | .. | .. |  | .. |
| .. |  | .. | .. |  | .. |

CauToAct

| ADDRESS ID | SUCCESS TIMES (*) | WEIGHT | NEXT NODE ID | SUCCESS TIMES (*) | CONDITIONAL BIT PATTERN |
|---|---|---|---|---|---|
| C0101 | 0 | 10 | A1001 | 0 | BIT ( 1101000.. ) |
|  |  | 10 | A1002 | 0 | BIT ( 1110111.. ) |
|  | 0 | 10 | A1003 | 0 | BIT ( 1101000.. ) |
| .. |  | .. | .. |  | .. |
| .. |  | .. | .. |  | .. |

NOTE : (*) THESE COLUMNS WILL BE INITIALIZED TO 0 FIRST, AND THEN EACH TIME, AFTER FINISHING DIAGNOSIS, IT WILL AUTOMATICALLY INCREASE 1 TO THE SUCCESS TIMES OF FOUNDED PROBLEM, SYMPTOM, CAUSE AND ACTION.

FIG.−17

| PROBLEM | |
|---|---|
| P0001 | " LINE FAIL " AFTER 30 - 40 SEC WITHOUT DOCUMENT SCANNING |
| P0002 | " LINE FAIL " AFTER 5 SEC |

| SYMPTOM | |
|---|---|
| S0010 | " CED " NOT DETECTED IN AUTO DIALING MODE |
| S0011 | " DIS " OR " NSF " NOT DETECTED FROM REMOTE FAX |
| S0012 | TRAINING FAILURE WITHOUT RESPONSE FROM REMOTE TERMINAL |

| CAUSE | |
|---|---|
| C0101 | TOO LONG DELAYED SIGNAL OR EXCESSIVE WHITE NOISE ON TEL LINE |
| C0102 | POSSIBLY, THE LOCAL TERMINAL CAN'T DETECT CED |
| C0103 | POSSIBLY, NSF/DIS SIGNAL DOESN'T COME FROM REMOTE TERMINAL |
| C0104 | SN RATIO IS TOO LOW |

| ACTION | | CONDITIONS |
|---|---|---|
| A1001 | ECHO COUNTERMEASURES | FX3300 |
|  | INSTALL A CARRIER-ON RETROFIT ROM | RAPI3300 |
| A1002 | SET THE ECHO COUNTERMEASURE SW2 BIT #6 ON | FX5000 I6500, R5000 |
|  | IF MACHINE IS NOT GROUNDED, REMOVE CAPACITORS C1, C2, C3 ON AA-NCU1 | FX5000 |
| C0103 | CHANGE CED TO 2100Hz | FX5000 |

FIG.-18

| MODEL ID | NAME | BIT POSITION |
|---|---|---|
| F0001 | R600s | 0 |
| F0002 | R700 | 1 |
| F0003 | RX5000 | 2 |
| F0004 | Rapi600 | 3 |
| F0005 | FX3300 | 4 |

| BIT PATTERN |
|---|
| 0000000 00000001 |
| 0000000 00000010 |
| 0000000 00000100 |
| 0000000 00001000 |
| 0000000 00010000 |

4. OPERATION
4-1. MAIN MENU 4-4. THE RAM ACCESS MENU

```
┌─────────────────────────────────────────────────┐
│ ──  │    FAX DIAGNOSTIC SYSTEM        │ ↑ │ ↓ │
├─────────────────────────────────────────────────┤
│ DATABASE   REPORT   RAM ACCESS                  │
│ ──         ──       ──                          │
│     ┌─────────────────────────────────────┐     │
│     │     COMMUNICATION CONFIGURATION     │     │
│     │ ┌─SERIAL PORT──────┐ ┌─BYTE SIZE─┐  │     │
│     │ │ 0 COM1   0 COM2  │ │ 0 7   0 8 │  │     │
│     │ ├─BAUD RATE─────────────────────┐   │     │
│     │ │ 0 9600  0 4800  0 3600  2400  │   │     │
│     │ ├─PARITY────────────────────┐   │   │     │
│     │ │ 0 NONE   0 ODD   0 EVEN   │   │   │     │
│     │ ├─STOP BITS─────────┐       │   │   │     │
│     │ │ 0 1   0 1.5   0 2 │       │   │   │     │
│     │ │    ┌────┐         ┌──────┐│   │   │     │
│     │ │    │ OK │         │CANCEL││   │   │     │
│     │ │    └────┘         └──────┘│   │   │     │
│     └─────────────────────────────────────┘     │
└─────────────────────────────────────────────────┘
```

FIG.—23

```
┌─────────────────────────────────────────────────┐
│ ──  │    FAX DIAGNOSTIC SYSTEM        │ ↑ │ ↓ │
├─────────────────────────────────────────────────┤
│ DATABASE   REPORT   RAM ACCESS                  │
│ ──         ──       ──                          │
│     ┌─────────────────────────────────────┐     │
│     │            RAM ACCESS               │     │
│     │                                     │     │
│     │  TELEPHONE NUMBER :                 │     │
│     │  ┌─────────────────────────────┐    │     │
│     │  └─────────────────────────────┘    │     │
│     │  START ADDRESS : ┌──┐ END ADDRESS : ┌──┐  │
│     │                  └──┘               └──┘  │
│     │                                     │     │
│     │    ┌────┐              ┌──────┐     │     │
│     │    │ OK │              │CANCEL│     │     │
│     │    └────┘              └──────┘     │     │
│     └─────────────────────────────────────┘     │
└─────────────────────────────────────────────────┘
```

FIG.—24

```
┌─────┬──────────────────────────────────┬─────┬─────┐
│  —  │       FAX DIAGNOSTIC SYSTEM      │  ↑  │  ↓  │
├─────┴──────────────────────────────────┴─────┴─────┤
│ DATABASE   REPORT   RAM ACCESS                     │
│ ─          ─        ─                              │
```

DATA TYPE TABLE

SYMBLE –
0. HEX
1. B. C. D.
2. ASCII
3. ASCII ( UPPER )

START ADDRESS : `70b0`
END ADDRESS : `70fa`

| # | STARTBYTE | TYPE | # | STARTBYTE | TYPE |
|---|-----------|------|---|-----------|------|
| 1. | 70b0 | 0 | 2. | 70b1 | 3 |
| 3. | 70d1 | 0 | 4. | 70d2 | 3 |
| 5. | 70e6 | 0 | 6. | 70E7 | 3 |
| 7. | — | — | 8. | — | — |
| 9. | — | — | 10. | — | — |
| 11. | — | — | 12. | — | — |
| 13. | — | — | 14. | — | — |
| 15. | — | — | 16. | — | — |
| 17. | — | — | 18. | — | — |
| 19. | — | — | 20. | — | — |

[ OK ]     [ CANCEL ]

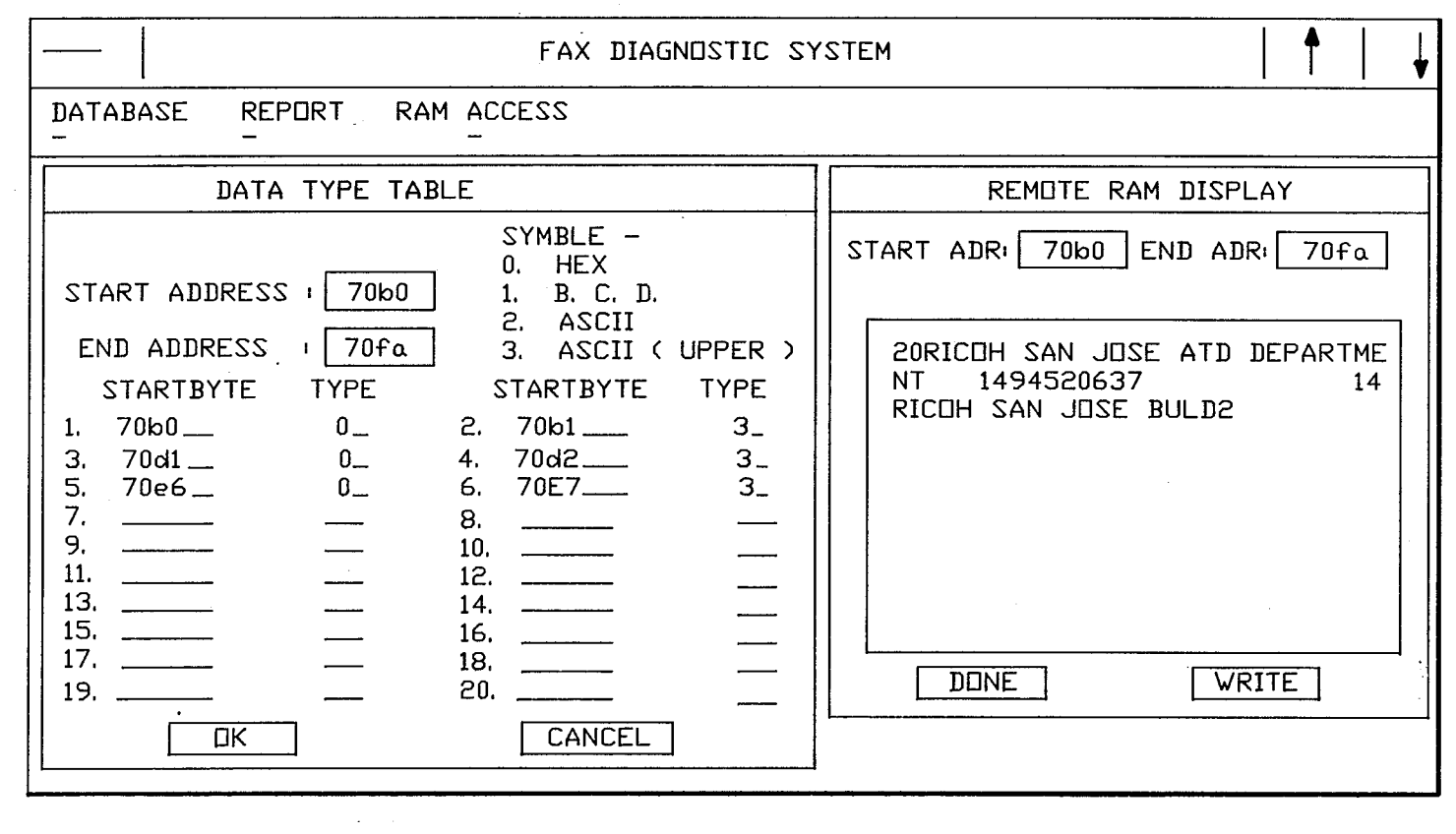

BIT SWITCH DISPLAY

| | | |
|---|---|---|
| 00 | 0000 | 0000 |
| 01 | 0100 | 0100 |
| 02 | 0000 | 0000 |
| 03 | 0000 | 0110 |
| 04 | 1000 | 0100 |
| 05 | 0000 | 0000 |
| 06 | 1100 | 0000 |
| 07 | 0000 | 0000 |
| 08 | 0000 | 0000 |
| 09 | 0000 | 0000 |
| 0A | 1011 | 0000 |
| 0B | 0110 | 0000 |
| 0C | 1000 | 0110 |
| 0D | 0001 | 0101 |

DONE

WRITE

FIG.-27

FACSIMILE REMOTE DIAGNOSTIC SYSTEM

BACKGROUND OF THE INVENTION

The present invention relates to a facsimile remote diagnostic system.

Facsimile is a well known technology which has been experiencing dramatic growth and usage in the business environment. Users recognize the inherent capability of facsimile as an effective means of transmitting many types of documents quickly and efficiently from a transmitting location to one or more remote receiving locations. Facsimile can quickly and efficiently transmit virtually any kind of document from one location to another in a very short transmission time, typically in seconds. This is a dramatic improvement over the sending of documents such as with the postal service and/or utilizing the various express courier services, which typically require overnight delivery of a document.

Users are demanding that the facsimile apparatus be readily available at virtually any time. Facsimile, however, can experience transmission and other types of problems, as with any other type of communications equipment. It becomes increasingly important, therefore, to provide a diagnostic capability for the facsimile apparatus for a particular user(s). The facsimile apparatus is typically located at an office, and it becomes very inefficient for a user to have to rely on a diagnostic service to come to the particular office to make necessary repairs to the facsimile apparatus.

In addition, the diagnostic service necessarily increases the cost of the overall equipment, as that service must be paid for in repairing the facsimile equipment.

In other technologies, some approaches have utilized remote diagnostic systems. The first remote diagnostic system was introduced in general by computer makers to provide checks for the current and prior status of the computer system by running diagnostic programs.

The next sophisticated remote diagnostic system introduced a capability using what can be characterized as expert knowledge. However, only one such system or unit is generally not enough to support field-installed equipment. In a facsimile environment, the dramatic expansion can at times demand concurrent diagnostics.

In view of the foregoing, it would be very desirable to provide a remote diagnostic system which can provide remote diagnostics for one or more remotely located facsimile apparatus.

SUMMARY OF THE INVENTION

It is an object of the present invention to provide a facsimile remote diagnostic system.

Briefly, the facsimile remote diagnostic system according to the present invention comprises one or more facsimile apparatus connected to a conventional telephone line.

The system further includes remote diagnostic means for communicating with the facsimile apparatus. The remote diagnostic means includes software control means (in one preferred embodiment) for providing remote diagnostics for the facsimile apparatus, and communication adapter means for controlling communications between the software control means and the facsimile apparatus.

The software control means can provide suitable diagnostics for the facsimile apparatus from a remote location, thereby eliminating the need for service personnel to go to the particular location where the facsimile apparatus requires diagnostic services.

Other objects, features and advantages of the present invention will become apparent from the following detailed description when taken in conjunction with the accompanying drawings.

BRIEF DESCRIPTION OF THE DRAWINGS

FIG. 5 depicts a screen display of a B switch setting screen display as utilized with the present invention.

FIG. 7 depicts a facsimile data base (prestructure) according to the present invention.

FIG. 8 depicts a facsimile registration window image.

FIG. 9 depicts a facsimile model table window image.

FIG. 10 depicts a RAM data definition window image.

FIG. 11 depicts a B switch definition window image.

FIG. 12 depicts a B switch default table window image.

FIG. 13 depicts an error code table window image.

FIG. 14 depicts a customer information window image.

FIG. 15 depicts a service center information window image.

FIG. 16 depicts a general flow of diagnosis according to the present invention.

FIG. 17 depicts a knowledge base representation.

FIG. 18 depicts a representation of data files.

FIG. 23 depicts a set comport command.

FIG. 24 depicts a display of RAM accessing.

FIG. 25 depicts a data type table display.

FIG. 26 depicts a RAM data display.

FIG. 27 depicts a bit switch display.

DETAILED DESCRIPTION OF THE INVENTION

The remote diagnostic system according to the present invention provides remote diagnostics for one or more facsimile apparatus, such as those manufactured by the applicant, Ricoh Corporation. Reference will be made herein to several facsimile models of Ricoh Corporation, although the aspects of the present invention would apply to all types of facsimile.

Figure 1:
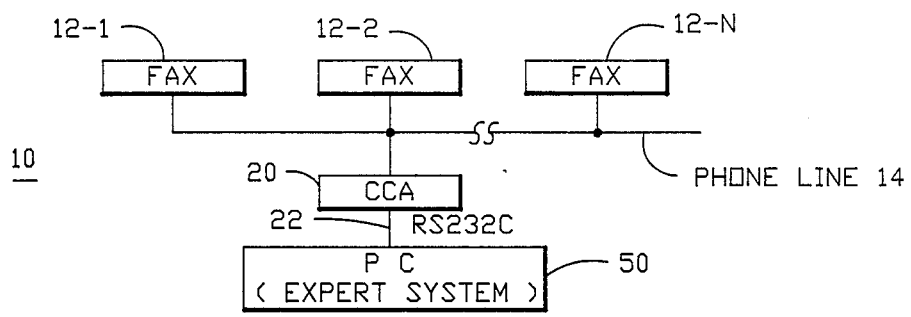
FIG. 1 depicts a block diagram of a remote facsimile diagnostic system according to the present invention.

The system 10 according to the present invention is shown in FIG. 1.

The system 10 comprises the following units: (1) one or more facsimile (FAX) 12, communication history of which is stored in memory accessible by remote way, (2) communication control adapter (CCA) 20 which can communicate with the FAX 12 and computer 50 through serial interface (RS232C) 22, and (3) personal computer 50 (including an expert system).

(1) Facsimile 12

The target facsimile is the G3 standard facsimile with the following additional functions: (a) buffer memory which can store communication histories including some image pattern, (b) bit switches which control the functions and mode by remote means, and (c) sensor status stored in the buffer memory.

(2) Communication Control Adapter 20

Figure 2:
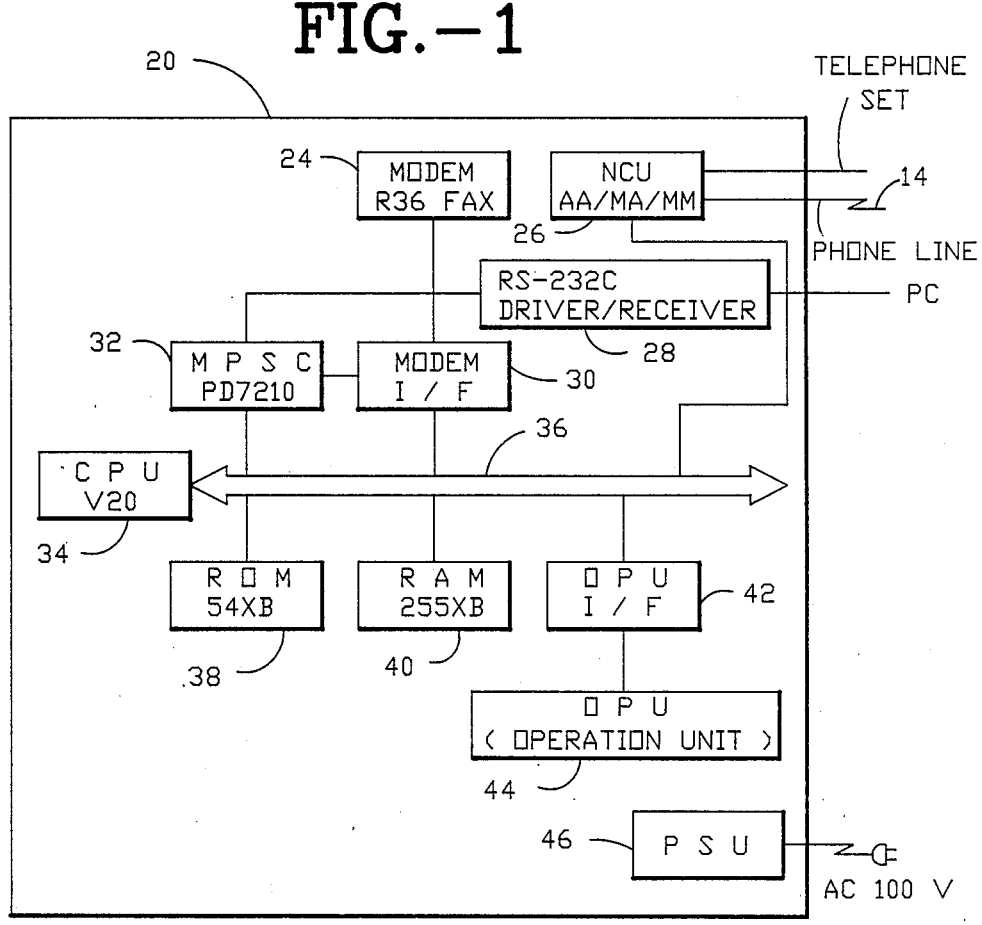
FIG. 2 depicts a block diagram of a communication control adapter which forms a portion of FIG. 1.

This unit has the same function as facsimile, network control unit (NCU), MODEM and protocol processor. Image communication with other FAX is possible. A block diagram of the CCA is shown in FIG. 2. FIG. 2 depicts a block diagram of the communication control adapter (CCA) 20. The CCA 20 includes a network control unit (NCU) 26 which controls data communication through a public telephone line 14. The main functions of the NCU 26 are startup of the unit, resetting or sendout of selected signals, calling signal detection and loop status maintenance (keep loop mode).

The CCA 20 also includes a modem 30 which provides data signal conversion to the transmission of analog signals and also provides the reverse inversions in a known fashion.

The CCA 20 further includes a multiple page signal controller (MPSC) 32 which detects the end of the page in image signal.

The CCA 20 also includes an operation port unit (OPU) 44 which controls the operation panel and keyboard.

Finally, the CCA 20 includes a power supply unit (PSU) 46 which provides suitable power as necessary.

CCA 20 has all the necessary functions of facsimile and digital interfaces to the PC 50 of FIG. 1. It can communicate with both current G3 facsimiles and computers and includes enough memory (RAM) 40 to store two-page document images.

(3) PC (Expert System) 40

Figure 3:
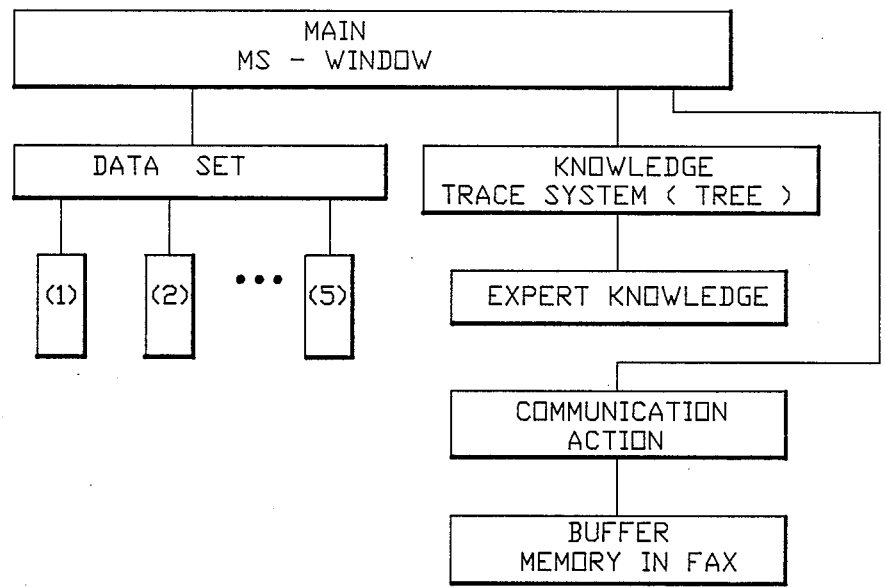
FIG. 3 depicts a block diagram of a PC expert system utilized with the present invention.

This part is newly developed with architecture as seen in FIG. 3. Details of the flow are shown in the accompanying Figures.

Figure 4:
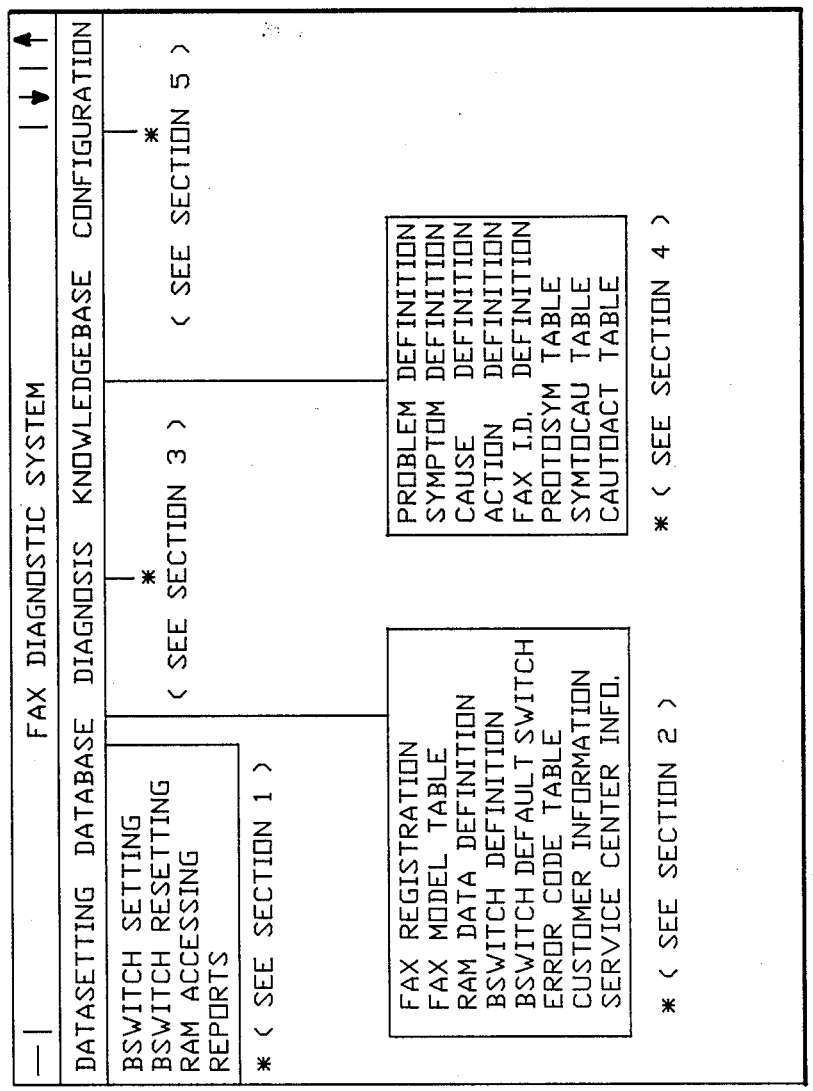
FIG. 4 depicts an illustration of the main function flow of the facsimile diagnostic system.

The main function flow of the FAX diagnostic system is shown in FIG. 4.

B Switch Setting

This function will allow the user to read all Bit Switch values from a remote FAX machine and then, if necessary, rewrite the new data back to the remote FAX machine. The Key is the customer name or customer FAX number. The screen will display as in FIG. 5.

B Switch Resetting

If Bit Switch values read from a remote FAX are not clear, this function will reset Bit Switch values for the remote FAX, based on the default values of the particular FAX model. After default values have been displayed on the screen, the user can modify any Bit Switch value and then rewrite all Bit Switch values back to remote FAX. The screen will display as FIG. 5. The only difference between these two functions is the former read data from remote FAX and the latter read data from Bit Switch default data base instead.

RAM Accessing

Figure 6:
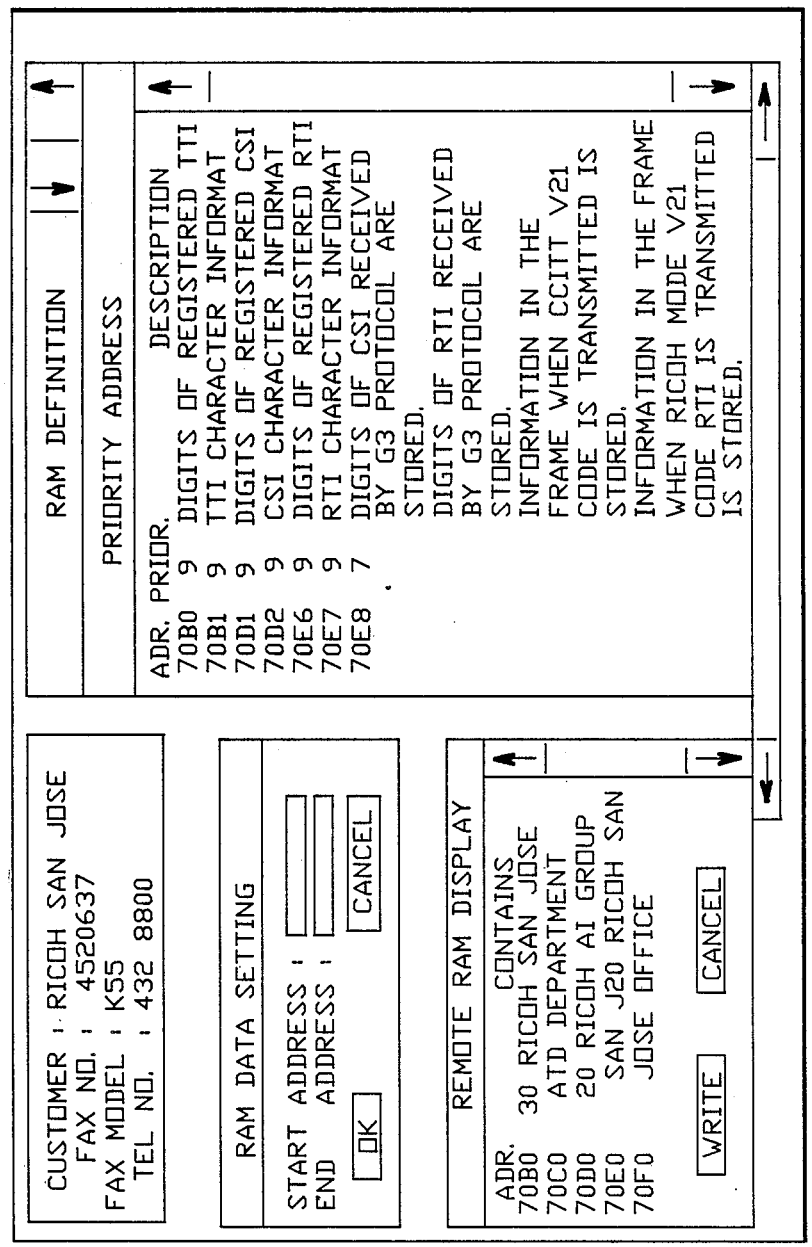
FIG. 6 depicts a RAM accessing screen display according to the present invention.

This function will allow the user to read a specific portion of RAM data from a remote FAX, and also easily modify those data on the screen and then rewrite the new data back to the remote FAX. The screen will display as in FIG. 6.

The RAM Definition window can have two displayed options:

(i) priority—display information on the screen started from the specified priority (ii) address—display information on the screen started from the specified address The user selects "Start Address" and "End Address" directly from the RAM Definition Table.

If the specified addresses are correct, the user clicks the "OK" button on the RAM Data Setting window. Then the system will start to access the remote RAM, and then display the retrieved data on the remote RAM Display window.

Users will be allowed to modify the data displayed on the remote RAM Display window (except for the Address column) and then, if necessary, the new data will be rewritten back to the remote FAX.

Reports

This function will supply various reports output, and allow the user to examine the important information through the screen display. The names of reports are:

TCR
Service Report
Transmission Report
Transfer Report
Error Report
System Report
Polling File List
Program List
Telephone List

Data Base

The FAX Data Base (tree structure) is shown in FIG. 7.

Data Base Entry

FAX Registration window image is shown in FIG. 8.
FAX Model Table window image is shown in FIG. 9.
RAM Data Definition window image is shown in FIG. 10.
B Switch Definition window image is shown in FIG. 11.
B Switch Default Table window image is shown in FIG. 12.
Error Code Table window image is shown in FIG. 13.
Customer Information window image is shown in FIG. 14.
Service Center Information window image is shown in FIG. 15.

Diagnosis

Figures 19, 20:
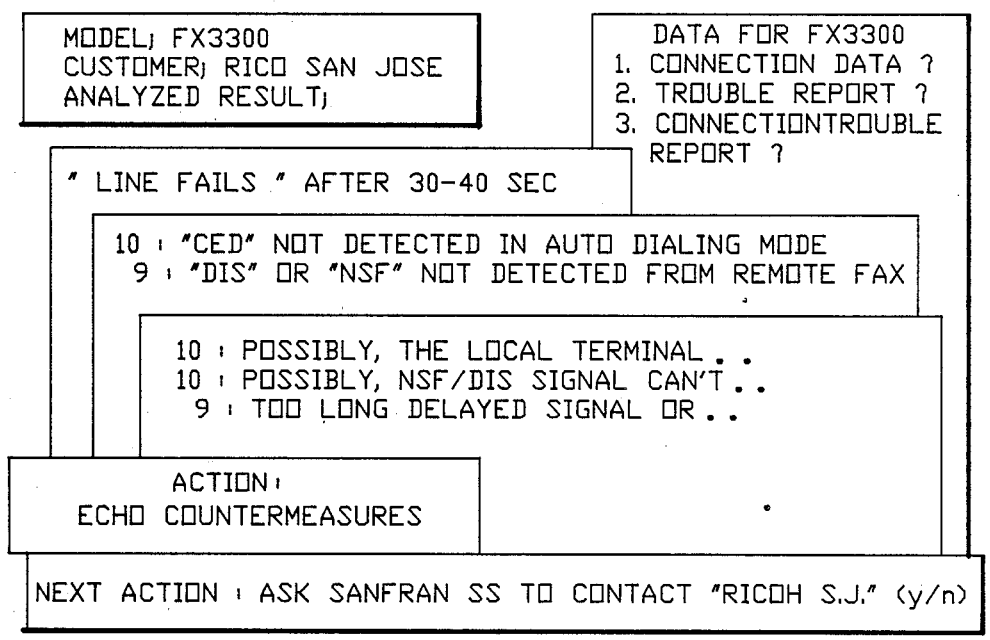
FIG. 19 depicts a representation of model data.
FIG. 20 depicts an illustration of system operation according to the present invention.

General Flow of Diagnosis is shown in FIG. 16.
Knowledge Base Representation is shown in FIG. 17.
Data Files are shown in FIG. 18.
Model Data is shown in FIG. 19.

How the System Works

FAX model is sometimes important to diagnose, because most knowledge is related to the model. In this example, FX3300 is stored in user's data base for initial communication setup. The customer's name is used as a key to connect the remote FAX. Another telephone number is necessary in case of FAX malfunctions.

Analyses results are reserved for future data analysis. The result of statistical analysis will be represented here.

"Line Fail," "CED Not Detected" and "DIS ... " are the part of the stored expert knowledge listed in the manual. Tables 3 and 4 are the example already stored in Ricoh. The result of this diagnosis is service "ACTION." This should be connected to the small data base of service engineers. The result of the diagnosis will be sent to the customer or service center via FAX or phone (if FAX doesn't work).

Another window "DATA for FX3300" is connected to the specific data concerning FX3300. Tables 1 and 2 are the example.

A description of the operation of the facsimile diagnostic system according to the present invention will now be provided. In order to run the system, a user will need a configuration such as depicted in FIG. 1, which includes a control system such as a PC/AT, XT or IBM PS2 which runs DOS operating systems. In addition, a hard disk and a double sided disk drive is recommended. However, two double sided disk drives can be utilized. The user will need a serial cable, a communication control adapter (CCA), a mouse, an analog telephone line and two serial ports or a serial and a mouse port. The software is typically one such as Microsoft Windows version 2.0 or later version, and DOS 2.0 or later version.

The hardware interconnection is as depicted in FIG. 1, in which a telephone line is connected to the CCA socket, which indicates line side. The user connects a serial cable to both the CCA and computer serial port, and connects the mouse to the serial port or to a mouse port.

The "DTE/DCE" switch is set to "DCE". In starting up, the operation is as follows:

(1) Copy "*.*" to the windows' working directory.
(2) When in DOS, enter "WIN FAXSET" and then press <Return>, or
(3) Select and run FAXSET.EXE in the MS-DOS Executive window. Starting FAXSET automatically creates an empty window where the user can select various commands. Before running the program, Microsoft Windows are usually already installed.

Figure 21:
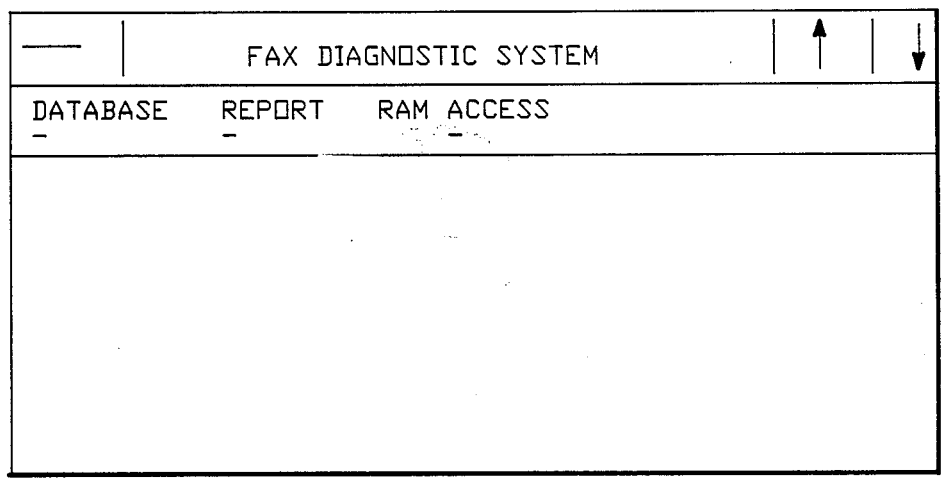
FIG. 21 depicts a main menu display according to the present invention.

The main menu on the display of PC of FIG. 1 is depicted in FIG. 21. In order to choose a Command from a Menu,
(1) if using the mouse, the user chooses a command from a menu:
  (i) Click the menu name on the menu bar,
  (ii) Click the command name.
(2) if using the keyboard, then follow these steps:
  (i) press the ALT key,
  (ii) press the underlined letter in the menu name,
  (iii) press the underlined letter in the command name.

In order to cancel a menu,
(1) if using the mouse and decide after selecting the menu that the user doesn't want to choose a command, the menu can be cancelled by pressing ESCAPE.
(2) if using the keyboard and decide after selecting the menu that the user doesn't want to choose a command, cancel the menu by clicking anywhere outside the menu. Clicking in a blank area of the window is best, so that the user doesn't select something else in the window without meaning to.

Figure 22:
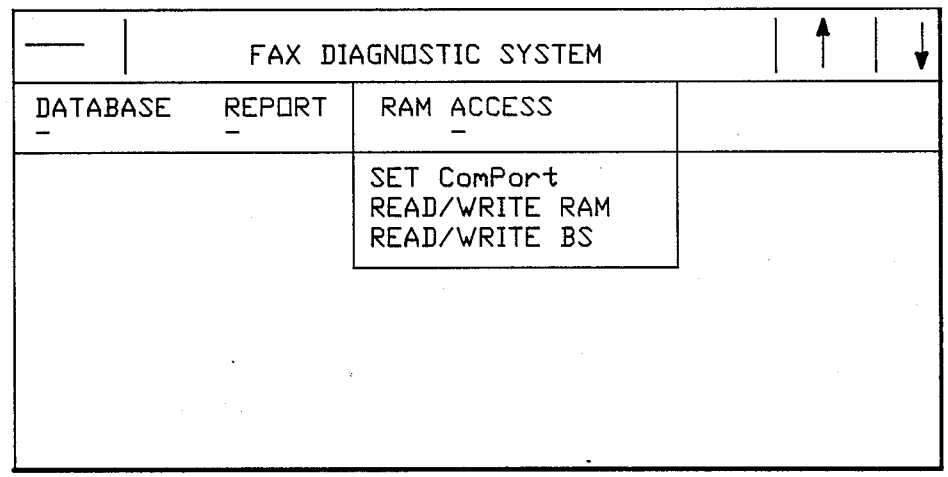
FIG. 22 depicts a RAM access menu display.

FIG. 22 depicts a RAM access menu on the display of the PC of FIG. 1.

In order to set up a communications port, the Set Comport command provides this function, as seen in FIG. 23. The user does this only if the port connection to CCA is different than default —COM1.

The user should use the mouse to select the right serial port which will communicate with CCA.

(i) Click "OK" to make some changes.
  (ii) Click "CANCEL" if no changes or discard those changes.

FIG. 24 depicts the display of RAM accessing.

(1) If the user receives a message "Error in opening Com Port" after selecting RAM accessing command, then reset communications port.
(2) Input target fax telephone number to telephone number blank field.
(3) Input the starting and ending address of RAM where the user is going to retrieve data from target facsimile. If the command menu selected is "Read/Write BS" then input the starting and ending address of whole bit-switch-table basing on target machines' models For example, if target machine is R50 series, then
  enter "0080" for starting address field, and
  enter "009F" for ending address field.
(4) Click "OK" if input information is correct.

Then the application program will automatically dial the telephone number entered and retrieve the remote fax information which store in the RAM just entered above. If the RAM address specified is larger than 256 bytes, the application program will need to dial another call to get the rest of the data from remote target facsimile. But, the RAM accessing will not success if the telephone number entered is incorrect, the target facsimile is busy, the target facsimile does not power on, or CCA does not power on.

For each of these causes, the application program will pop up a related message on the screen. Here are some actions which should be followed:
  (i) Reexamine the information entered on the screen.
  (ii) Check the target facsimile's current status—power is off or machine is still busy.
  (iii) Check CCA's connection and power switch.
(5) Click "CANCEL" if it is decided not to continue the program.

After data has been retrieved successfully from the target facsimile, the user needs to input data type for each address group. The window will display as seen in FIG. 25. For example, if retrieving the remote RAM from 70b0 to 70fa out of R50 series machines, the corresponding information will be TTI counter, TTI, CSI counter, CSI, RTI counter and RTI.

As defined, all three counters are HEX types and all three identifications are ASCII (upper case) types. Therefore, the input sequence will be as above table, which means:

| | |
|---|---|
| Address 70b0 stores a HEX data | (TTI counter) |
| Address from 70b1 to 70d0 stores ASCII (upper) data. | {TTI} |
| Address 70d1 stores a HEX data | (CSI counter) |
| Address from 70d2 to 70e5 stores ASCII (upper) data. | (CSI) |
| Address 70e6 stores a HEX data | (RTI counter) |
| Address from 70e7 to 70fa stores ASCII (upper) data. | (RTI) |

Click "OK" if input information is correct, and click "CANCEL" if it is decided not to continue the application program.

RAM Data Display

After clicking "OK" on the "Data Type Table" window, the user can check the target facsimile information on the "Remote RAM Display" window as seen in FIG. 26. In this case,

| | |
|---|---|
| TTI counter | is 20 (HEX) |
| TTI | is RICOH SAN JOSE ATD DEPARTMENT |
| CSI counter | is 14 (HEX) |
| CSI | is 94520637 |
| RTI counter | is 14 (HEX) |
| RTI | is RICOH SAN JOSE BULD2 |

If the user needs to rewrite the information displayed on the screen, follow these steps:
(1) Use mouse and click on that particular position
(2) Type in new data
(3) Click "WRITE" if the user wants to write the new data back to target facsimile
(4) Click "DONE" if all data has been examined Since the maximum digits which can be entered for TTI is 20 (HEX), which is 32 (decimal), the user should not overtype new data to the next field, which will be a counter of CSI; also, the same as CSI, RTI, and some other similar cases.

If the size of retrieved data is larger than the size of the display window, the window will offer a vertical scroll bar on the right margin of the window. Then the user can use the scroll bar to review all of the data.

If the user needs to modify some data and rewrite back to target facsimile, then the application program will only rewrite those data which shows on the current window.

After data has been retrieved successfully from the target facsimile, the user can check the target facsimile Bit Switch information on the "Bit Switch Display" window in FIG. 27. If the user needs to rewrite the information displayed on the screen, follow these steps:
(1) Use mouse and click on that particular position.
(2) Type in new data.
(3) Click "WRITE" if the user wants to write the new data back to target facsimile.
(4) Click "DONE" if all the data has been examined.

What is claimed is:
1. A remote facsimile diagnostic system comprising one or more facsimile apparatus,
remote diagnostic means for remotely communicating with each of said facsimile apparatus including communication,
adapter means for controlling communications with said facsimile apparatus,
a telephone line connected between each of said facsimile apparatus and said remote diagnostic means, and
remote control means for providing remote diagnostics of each of said facsimile apparatus through said communication adapter means over said telephone line wherein said control means is a programmed personal computer, including means for storing programmed control instructions for providing diagnostics to said facsimile apparatus.

2. A system as in claim 1 wherein each of said facsimile apparatus includes memory means for storing communication histories, bit switches for controlling functions and modes through said remote diagnostic means, and sensor status means.

3. A system as in claim 2 wherein said remote control means includes means for retrieving the memory contents of each of said facsimile memory means.

4. A system as in claim 3 wherein said remote control means includes means for displaying the retrieved facsimile memory contents, including means for distinguishing the memory content values which are different from their respective default values.

5. A system as in claim 4 wherein said remote control means includes means for repairing a defective one of said facsimile apparatus, including means for writing new memory content values to the defective facsimile memory means.

6. A system as in claim 5 wherein said remote control means includes means for providing repair instructions to each of said facsimile apparatus.

* * * * *

UNITED STATES PATENT AND TRADEMARK OFFICE
CERTIFICATE OF CORRECTION

PATENT NO. : 4,965,676
DATED : October 23, 1990
INVENTOR(S) : Koichi Ejiri; Tina Jeng; Rithy Roth, and Lak M. Lam.

It is certified that error appears in the above-identified patent and that said Letters Patent is hereby corrected as shown below:

| Figure: | Description: |
|---|---|
| 2 | Change "ROM 54XB"  "RAM 255XB"  to --ROM 54KB--  --RAM 255KB-- |
| 4 | Change "DEFAULT SWITCH" to --DEFAULT TABLE-- |
| 8 | Change "SERIES + '.' + 'DAT' " to --SERIES + "." + "DAT"-- |
| 10 | Change "SERIES + "RAM" + "DAT" " to --SERIES + "RAM" + " . " + "DAT"-- |
| 16 | Change "MENUE" to --MENU-- |
| 20 | Change "ASK SANFRAN SS" to --ASK SANFRAN SS-- |
| 26 | Change "SYMBLE" to --SYMBOL-- |

Signed and Sealed this

Second Day of June, 1992

Attest:

DOUGLAS B. COMER

Attesting Officer            Acting Commissioner of Patents and Trademarks